Dec. 3, 1963 P. HOBLEY 3,113,280
ELECTRO-MAGNETIC MEANS FOR MEASURING A MECHANICAL EXCURSION
Filed Jan. 16, 1961 3 Sheets-Sheet 1
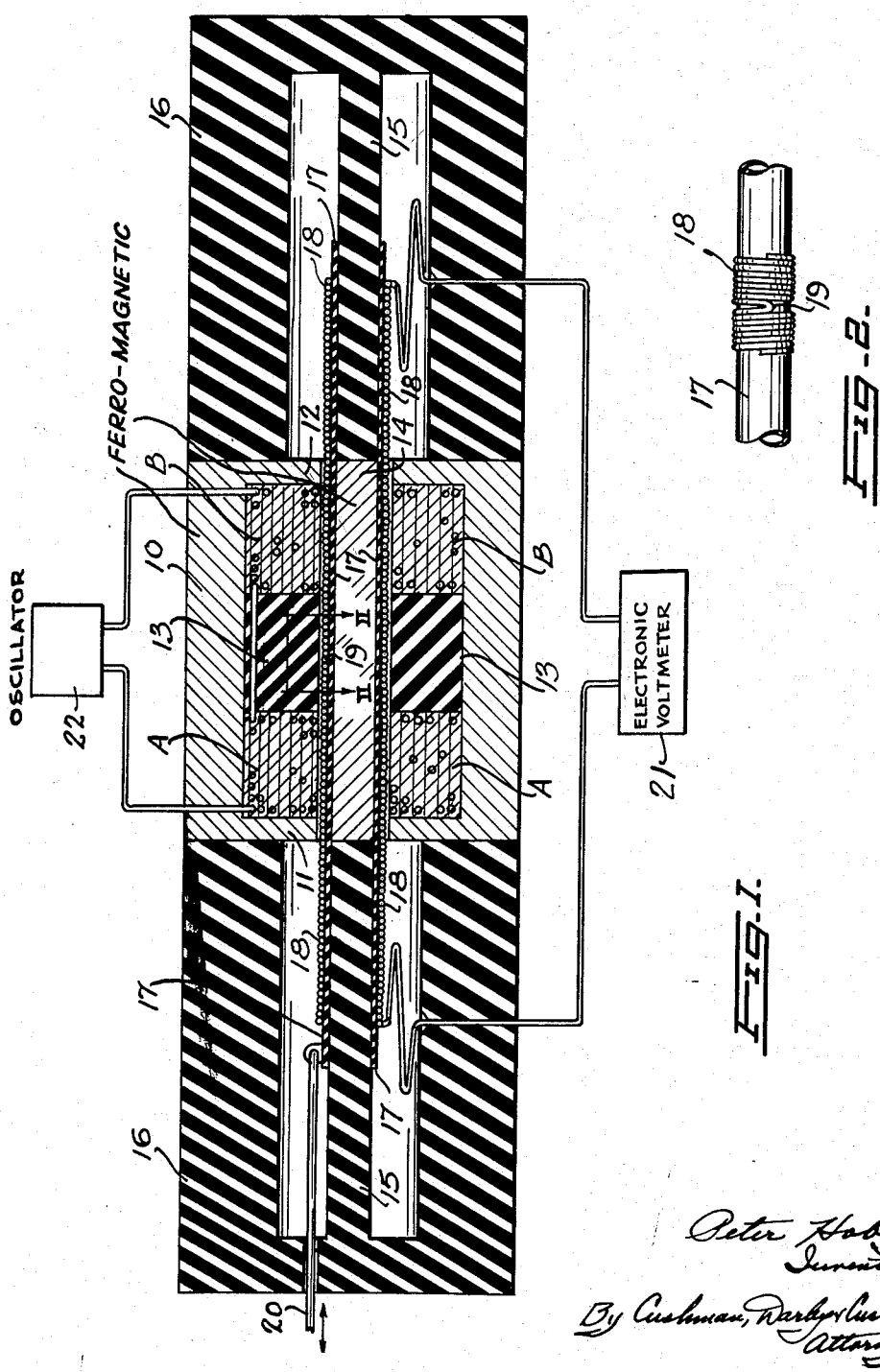

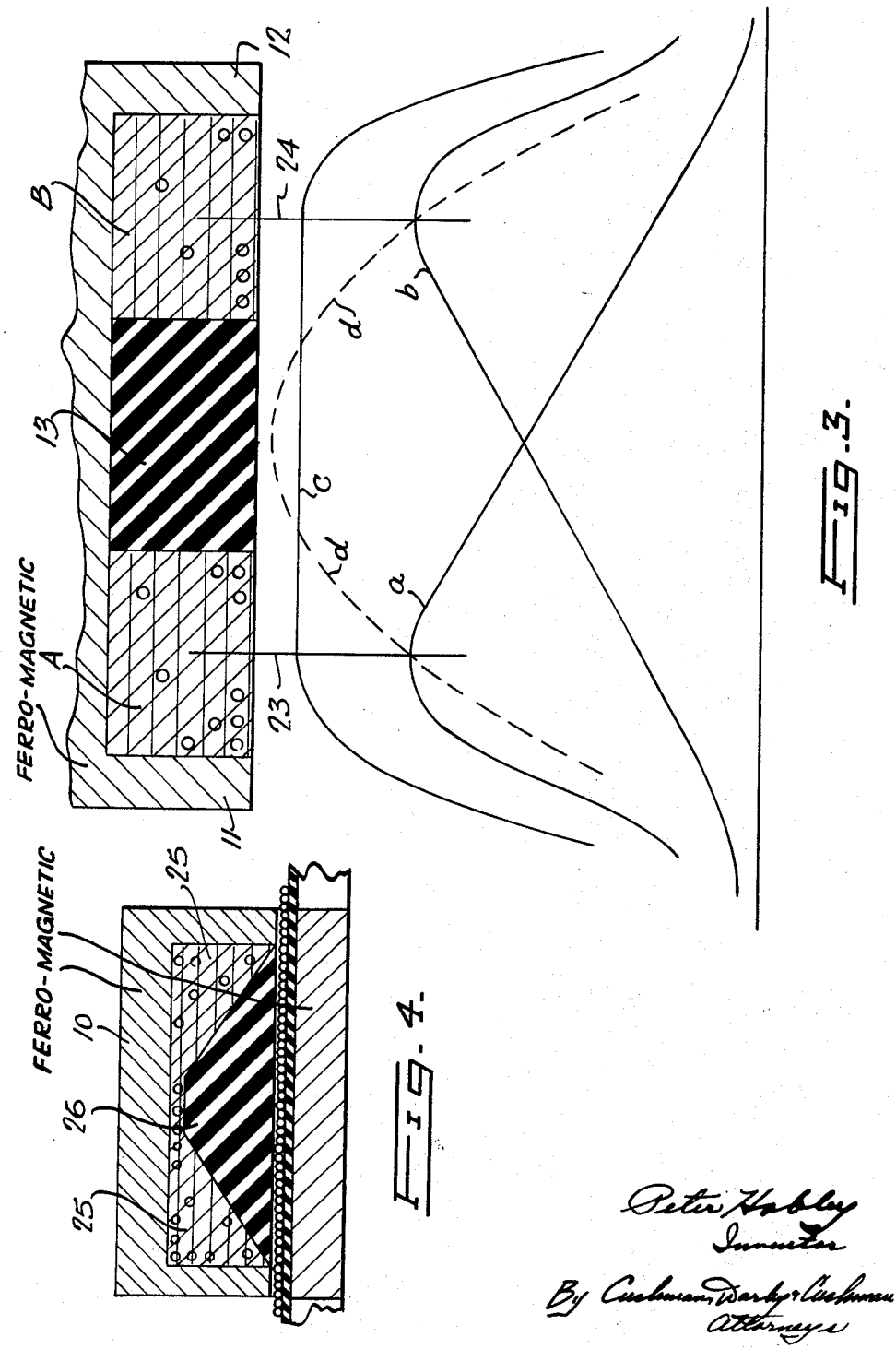

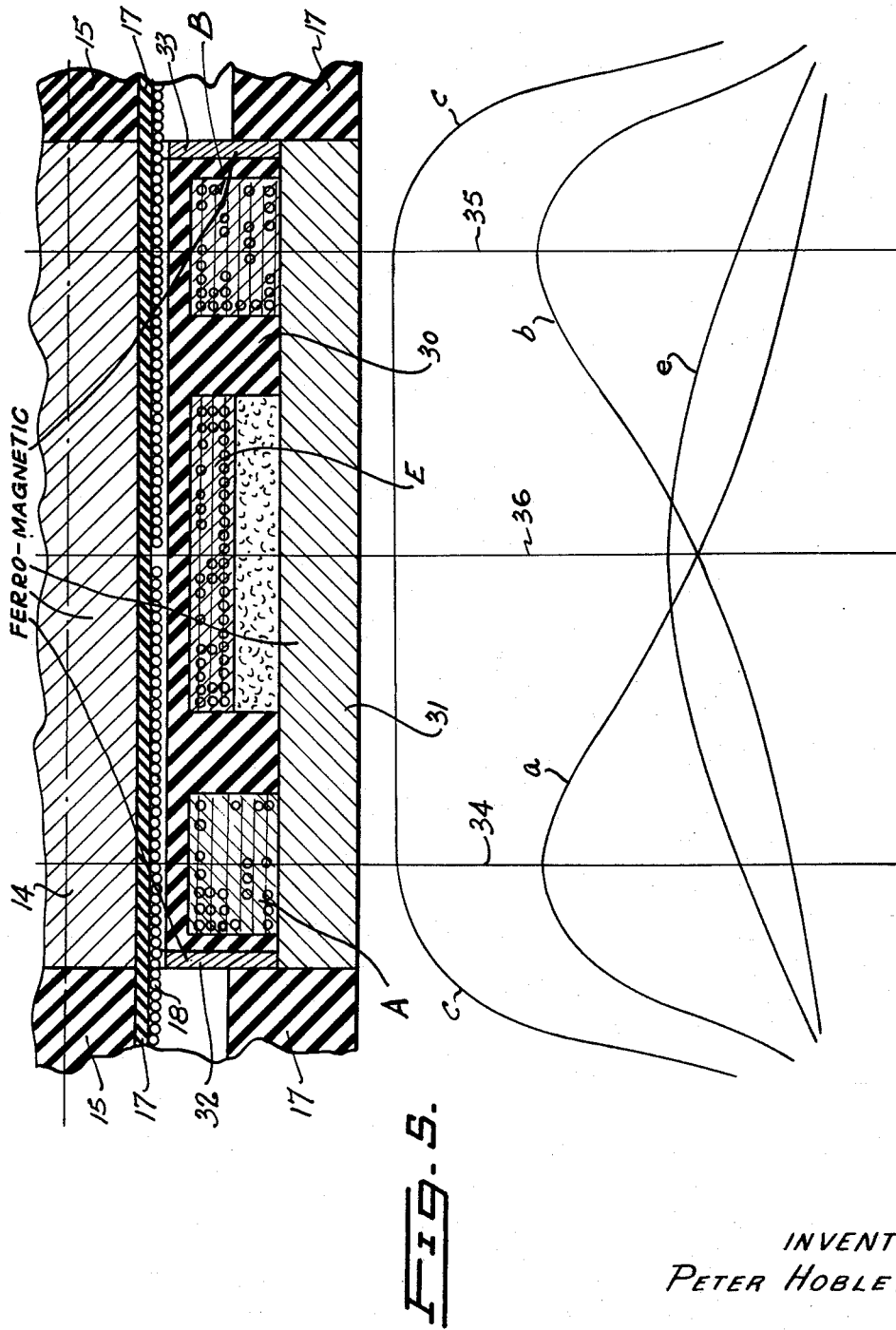

** 3,113,280
ELECTRO-MAGNETIC MEANS FOR MEASURING
A MECHANICAL EXCURSION
Peter Hobley, 103 Michigan Ave., Pointe Claire,
Quebec, Canada
Filed Jan. 16, 1961, Ser. No. 83,115
Claims priority, application Canada Feb. 1, 1960
13 Claims. (Cl. 336—118)

This invention relates to a device for measuring a mechanical excursion, and more specifically to a device for the translation of a mechanical excursion into an electrical voltage which can be accurately measured, whereby to determine with a high degree of precision the exact value of such mechanical excursion. Devices for this general purpose are known and the object of the present invention is to provide improved performance in such a device, and specifically an improvement in the length of throw over which an acceptable degree of linearity is obtained.

Subsidiary objects of the invention are the production of a device of small size and low mass in comparison with the length of usable throw, and the production of a device that suffers to a minimum extent from solenoid effects and is substantially unaffected by extraneous magnetic fields.

The invention will now be further explained with reference to the specific embodiments thereof illustrated by way of example in the accompanying drawings, in which:

FIGURE 1 shows, on an enlarged scale, a longitudinal central section of one form of apparatus in accordance with the invention;

FIGURE 2 is a fragmentary view taken in the direction of II—II in FIGURE 1;

FIGURE 3 is a diagram illustrating the magnetic field obtained with the system of FIGURE 1; and FIGURE 4 is a fragmentary view of a modified construction.

FIGURE 5 shows a further alternative construction.

Reference will first be made to FIGURES 1 and 2 which show a pair of similar primary coils A and B mounted within a ferro-magnetic annular yoke 10 which terminates in a pair of radially inwardly extending end members 11 and 12 which enclose the ends of the coils A and B and define axially-spaced, annular pole pieces. The coils A and B are spaced from one another and between them there is mounted a non-magnetic, spacer member 13. All these parts are annular in form and define a central axial space in which there is mounted a ferro-magnetic core 14 supported at each end by non-magnetic rods 15 which extend into non-magnetic frame members 16 which are secured to the yoke 10 in any convenient manner, in order to provide a rigid structure and to position the core 14 accurately coaxially with the yoke 10. In the annular air gaps formed between the pole pieces 11 and 12 and the core 14 there is positioned a tube 17 which is slidably mounted on the core 14 and its support rods 15. The tube 17, which is preferably also of non-magnetic material, carries a single layer secondary coil 18. The coil 18 is wound in one sense for one half of its length, and in the other sense for the other half of its length, the change from one direction of winding to the other taking place at the point 19 (FIGURE 2) which is positioned longitudinally centrally of the assembly. If preferred the two parts of coil 18 may be wound in the same sense as each other, the opposing effect being achieved by externally connecting the two parts in opposition.

The yoke 10 and the parts fixed in relation thereto form a first assembly, while the tube 17 and coil 18 form a second assembly movable relatively to such first assembly. Longitudinal movement of the second assembly is controlled by an arm 20 which is connected to the tube 17 and extends to the exterior of the apparatus for connection to some external instrumentality, the movement of which is required to be measured. The mechanical excursion to be measured is thus the movement of arm 20 and hence of the tube 17.

The two ends of the coil 18 extend to an electronic voltmeter 21, sufficient slack being left at each end of the coil to permit free travel of tube 17 within the limits of the throw for which the apparatus is designed. Coils A and B are connected in series with one another and are supplied with an alternating voltage from a suitable oscillator 22, these coils being so wound and connected as to produce magnetic fields in phase with each other, so that such fields will combine additively to produce a single magnetic field extending spatially uninterruptedly from one pole piece to the other. If preferred, the coils may be connected in parallel with each other. The reference to "spatial" lack of interruption is in contradistinction to the temporal interruption of the field that takes place each cycle, since the field is an alternating one.

When coils A and B are energized by oscillator 22, an alternating magnetic field is set up extending along the yoke 11 and from each of the pole pieces 11 and 12 through the air gaps into the core 14. An alternating voltage is accordingly induced in the secondary coil 18. The frequency chosen will depend on the application of the device. The sensitivity of the instrument increases with frequency for a given primary current, but too high a frequency may bring the increased reactive effects to an undesirable level. The secondary voltage will be of opposite sign at the two ends of the coil 18. Thus when the turn-round point 19 of coil 18 is centrally situated in relation to the fixed assembly and hence to the magnetic circuit, the net output detected by the electronic voltmeter 21 will be zero, since the magnetic circuit will thread the same number of turns of the coil 18 wound in one sense as those wound in the other sense.

When the tube 17 which supports the coil 18 is moved one way or the other from this central position, there will be more turns cut by the magnetic field wound in one sense than in the other. Voltmeter 21 will accordingly indicate the net voltage resulting. At the ends of the core 14 there will be some fringe magnetic field extending outwardly beyond the outer surfaces of pole pieces 11 and 12, but this effect will be the same at both ends, since the device is symmetrically constructed. Accordingly the effect of the fringe fields will cancel out, provided the coil 18 always extends sufficiently beyond each pole piece. To ensure this, the coil 18 in the central position seen in FIGURE 1 must extend axially outwardly beyond each pole piece by a distance somewhat greater than half the maximum throw of tube 17, that is the distance of travel of point 19 from a central disposition to one limit of its travel. The amount greater than this value that the coil 18 must extend will depend on the nature of the fringe field which in turn will depend on design factors generally. The fringe field can be expected to be more extensive if the core 14 is dispensed with, as it can be, although it is preferred to employ a core principally to minimize this fringe field.

The prime purpose of the present construction is to obtain a high degree of linearity between mechanical excursion of the tube 17 and the voltage output over a comparatively long throw. The voltage recorded by the voltmeter 21 will then be an accurate linear indication of mechanical excursion, which is an important commercial asset for a device of this character. One of the principal difficulties with prior art devices has been that they have been able to obtain linearity only over a very short travel.

It will be appreciated that the key to this desired linearity of output is uniformity of magnetic field along the length of the axial path in which the core 14 lies. As the tube 17 is moved a distance to the right equal to one turn of the coil 18, one more turn of the left hand end of the coil is threaded by the axial magnetic field, while one less turn of the right hand end of the coil is so threaded. The resulting change in the output voltage will be the sum of the voltage no longer induced in the lost turn and the voltage now induced in the gained turn. These voltages will be proportional to the field strength at the point where the loss and gain take place, namely at approximately the longitudinal centre of the field. Once the tube 17 has been moved a larger distance to the right to a new reference position any further movement of the tube by the distance of one turn will again result in one more and one less turn threading the field, but the field then in question where the loss and gain take place is the field at the new displaced reference position. Linearity is achieved when movement of the tube 17 by the distance equal to one coil turn will produce the same voltage change at the displaced position as at the central position (assuming uniformity in the winding of coil 18). It follows that this requires the field strength in the axial path in which the core 14 lies to be the same all the way along such path to the displaced position. Clearly the most desirable condition would be for the field strength to be uniform along the entire length of the path, that is, in the example illustrated, along the entire length of the core. It has not yet been possible to achieve this result at the very extreme ends of the core, but by means of the present invention a substantial degree of linearity has been achieved over a major portion of the length between these ends.

One manner in which this uniformity can be achieved is by forming the primary coil structure as the two separate coils A and B. FIGURE 3 contains typical graphs of the magnetic fields $a$ and $b$ generated in the core 14 by the coils A and B such graphs $a$ and $b$ being shown beneath a fragmentary and still further enlarged view of the primary coil structure and pole pieces, to demonstrate the relationship therebetween. For ease of illustration only the top portion of the complete coil and yoke structure is shown in FIGURE 3, but it will be understood that the field characteristics obtained are those resulting from a complete annular construction such as shown in FIGURE 1. The purpose of the inclusion of the coil structure in FIGURE 3 is to demonstrate the relationship between this structure and the field characteristics in the longitudinal direction of the core. Each of these graphs $a$ and $b$ will be seen to reach a peak approximately beneath the centre of the coil giving rise to the field under consideration and to fall away on both sides. However, the effect of the iron circuit on the field generated by coil A is to elongate this field towards the right. Correspondingly the iron circuit has the same effect on the field due to the coil B. If the dimensions are carefully chosen, these two fields when added together arithmetically (there is no significant phase difference) result in the third graph $c$ shown in FIGURE 3, which is seen to have a substantially linear portion between the lines 23 and 24. It will be appreciated that graph $c$ is idealized to some extent and that in a commercial device some deviation from a perfect straight line can be expected. Nevertheless the extent of linearity which graph $c$ represents is much greater than can be achieved with a single uniformly wound primary coil, because any such coil will always provide a field the strength of which when plotted will produce a peaked graph. Broken line $d$ illustrates the type of field that a single coil such as has been used in prior art devices will produce. This field is never truly linear, and the extent over which a tolerable approximation to linearity is available is clearly far less than with graph $c$.

The construction shown in FIGURE 1 in which the primary coil structure is constituted by two axially-spaced coils is perhaps the most convenient form from the point of view of practical manufacture, but there are other constructions which will provide a similar linearity of field. For example, FIGURE 4 shows an alternative construction in which the primary coil is a single continuous coil wound in two interconnected sections 25 on a coil former 26, sections 25 each being approximately triangular in cross-section. Again by careful selection of the dimensions, it is possible to obtain a substantial length of field uniformity.

Once the electrical dimensions have been chosen and the length of travel over which reasonable linearity can be achieved has thus been determined, the mechanical dimensions of the apparatus will preferably be selected so that the total throw of the mechanical excursion is approximately equal to the extent of field uniformity.

An electronic voltmeter is used to measure the output from the coil 18, because of its very high impedance. In this way, the current in the coil 18 is maintained at a very low value so that the solenoid effect is negligible. The solenoid effect is the force acting on the coil 18 to centre it within the magnetic field, which force is a function of the secondary current. A phase detector may be associated with the voltmeter in order to indicate which way the tube 17 has been moved from the centre point.

It was mentioned above that coil 18 is assumed to be wound uniformly. This result may be achieved by winding each turn tightly against its neighour, subject to suitable care being taken in the manufacturing process. The linearity inherent theoretically in the present invention will only be realised in practice if adequate skill is exercised in the manufacturing process. If it is preferred to use uninsulated wire to save weight and the space occupied by the insulation, each turn will have to be spaced from the adjacent turns and great care will have to be exercised in ensuring uniformity of this spacing. Unless the pitch of the coil is uniform, not only for turns but also for fractions of turns, some reduction in the degree of linearity will result. Of course, for some special application, an intentional variation in the coil spacing would produce a controlled non-linearity, an effect which is within the present inventive concept.

FIGURE 5 is a combined fragmentary sectional view of an alternative construction, and diagram illustrating the magnetic field obtained with such construction. The device seen in FIGURE 5 is similar to that of FIGURES 1 to 3, except that three primary coils A, B and E are used instead of just two primary coils. Coils A and B are shorter than before and are wound one on each end of an insulating former 30 which also mounts the central coil E. This structure is surrounded by a ferro-magnetic yoke 31 similar to the yoke 10 except that separate discs 32 and 33 form the end members or annular pole pieces, instead of the integrally formed members 11 and 12. All these parts are annular in form (although only the sections on one side of the central axis are shown in the drawing) so that, as FIGURE 1, they define a central axial space in which there is mounted a ferromagnetic core 14 supported at each end by non-magnetic rods 15 (which may be a synthetic plastic material or a non-magnetic metal such as brass). This core 14 and the rods 15 are similar to the same parts already described with reference to FIGURE 1 and they also serve slidingly to support the tube 17 on which the secondary coil 18 is wound.

Since all major parts of this form of the device, except the primary coils, are identical with those shown in FIGURE 1, no further description of their construction or operation is necessary. Attention will be directed instead to the diagram portion of FIGURE 5, which portion follows generally the diagram portion of FIGURE 3 in layout. Lines 34, 35 and 36 respectively define the longitudinal centers of coils A, B and E, and curves $a$, $b$, and $e$ represent the strengths of the magnetic fields along the device due to coils A, B and E respectively. As before, these fields are added to produce curve $c$, which has a substantially linear portion between lines 34 and 35.

It has been found in practice that a somewhat higher degree of linearity of total field between lines 34 and 35 can be obtained with the three coil construction of FIGURE 5 than with either of the constructions of FIGURES 1 and 4. As shown in FIGURE 5, the central coil is preferably rather longer than the combined lengths of the end coils, but produces a field of less intensity, that is, is either wound with fewer turns per unit length or is so connected as to pass a smaller current than coils A and B. The essential criterion is a lower ampere-turns density, that is less ampere-turns per unit length; otherwise the curve $e$ would be too high and would tend to form a hump in the centre of curve $c$. By making the central coil comparatively long, curve $e$ is caused to fall away gradually from its peak value. This reduces any tendency for the curve $c$ to have dips between lines 34 and 36 and between lines 35 and 36.

A wide latitude of methods of connecting the coils is available. For example, all three coils may be connected in series (with a shunt resistor across the central coil, if found necessary for adjustment purposes); or the central coil (with a series adjustment resistor, if desired) may be connected in parallel with a series connection of the two end coils. Both these connections have been found to yield excellent results and obviously other arrangements are possible. It is, of course, essential that the electrical connections of the coils be such that their fields combine additively to form a single magnetic field that extends from one pole piece to the other. Whether or not adjustment resistors are found necessary will depend mainly on the extent to which the device is required to be frequency insensitive and the precision of design and manufacture. Very careful design can make the performance of the device independent of frequency, but there may be occasions when it is preferred merely to compensate for frequency dependent factors by adjustment resistors.

As before, the total primary coil structure will be connected to an oscillator, and the secondary coil structure will be connected to a voltmeter, and the manner of use will be as in FIGURE 1.

I claim:

1. A device for measuring a mechanical excursion, said device comprising two relatively movable assemblies to which said mechanical excursion is communicated, the first such assembly comprising an annular ferro-magnetic yoke terminating in a pair of radially inwardly extending end members defining axially-spaced, annular pole pieces, and means to set up a single magnetic field extending spatially uninterruptedly along the axial path from one said pole piece to the other, said means comprising a primary coil structure magnetically associated with said yoke, said field being of substantially uniform strength along a longitudinally central portion of said path which is approximately as great in length as the maximum throw of said excursion, the second such assembly comprising a secondary coil structure supported coaxially in said path for movement therealong, said secondary coil structure extending axially outwardly beyond both said end members by an amount greater than half the maximum throw of said excursion whereby in all positions of said secondary coil structure to locate each end thereof beyond the fringe magnetic field extending outwardly from the adjacent said end member, said secondary coil structure being divided centrally of its longitudinal extent into two coil portions connected in opposition to each other.

2. A device according to claim 1, including an elongated ferro-magnetic core extending along said path within said secondary coil, said core being fixed in position in relation to said first assembly.

3. A device according to claim 1, wherein said secondary coil structure comprises a support member and a single layer of mutually uniformly spaced coil turns wound thereon.

4. A device according to claim 1, wherein said primary coil structure has a concentration of turns at each end of said yoke.

5. A device according to claim 1, wherein said primary coil structure comprises a pair of coils each wound coaxially with the axis of said yoke, said coils being spaced apart from each other in the axial direction of said yoke and electrically connected together to generate additively said single magnetic field.

6. A device for measuring a mechanical excursion, said device comprising two relatively movable assemblies to which said mechanical excursion is communicated, the first such assembly comprising an annular primary coil structure, an annular ferro-magnetic yoke embracing said coil structure while being coaxial therewith, said yoke including a pair of enclosing end members defining axially-spaced, annular pole pieces, and an elongated ferro-magnetic core disposed coaxially within said yoke and extending between said pole pieces while defining annular air gaps therewith, said primary coil structure having a concentration of turns adjacent each said end member, said primary coil structure comprising means for setting up a single magnetic field extending spatially uninterruptedly along said core from one said pole piece to the other with said field of substantially uniform strength in said core along the major central portion of the length thereof, the second such assembly comprising a tubular support member mounted to be slidable along said core and a secondary coil wound on said support member coaxially therewith while extending outwardly beyond both said end members by a distance greater than half the maximum throw of said excursion whereby in all positions of said support member to locate each end of said secondary coil beyond the fringe magnetic field extending from the adjacent said pole piece to said core, said secondary coil being divided centrally of its longitudinal extent into two portions connected in opposition to each other.

7. A device as claimed in claim 6, wherein said primary coil structure comprises a pair of coils axially spaced from each other and electrically connected together to generate additively said single magnetic field.

8. A device as claimed in claim 6, wherein said primary coil structure comprises a single coil extending continuously from one said end member to the other, said coil having a maximum number of superposed turns at each end adjacent a said end member and a minimum number of turns at its central area intermediate said ends.

9. A device as claimed in claim 6, wherein said secondary coil comprises a single layer of turns, each portion of the coil being made up of mutually uniformly spaced turns.

10. A device according to claim 1, wherein said primary coil structure comprises three coils each wound coaxially with the axis of said yoke, said coils being spaced apart from each other in the axial direction of the yoke and electrically connected together to generate additively said single magnetic field.

11. A device according to claim 10, wherein the outer two of said three coils are alike, while the central coil is substantially longer and is adapted to produce a field of less ampere-turns density than said outer coils.

12. A device according to claim 6, wherein said primary coil structure comprises three coils each wound coaxially with the axis of said yoke, said coils being spaced apart from each other in the axial direction of the yoke and electrically connected together to generate additively said single magnetic field.

13. A device according to claim 12, wherein the outer two of said three coils are alike, while the central coil is substantially longer and is adapted to produce a field of less ampere-turns density than said outer coils.

References Cited in the file of this patent

UNITED STATES PATENTS

| | | |
|---|---|---|
| 2,459,210 | Ashcroft | Jan. 18, 1949 |
| 2,507,763 | Caine | May 16, 1950 |
| 2,785,356 | Nisle | Mar. 12, 1957 |